Figure 1A:
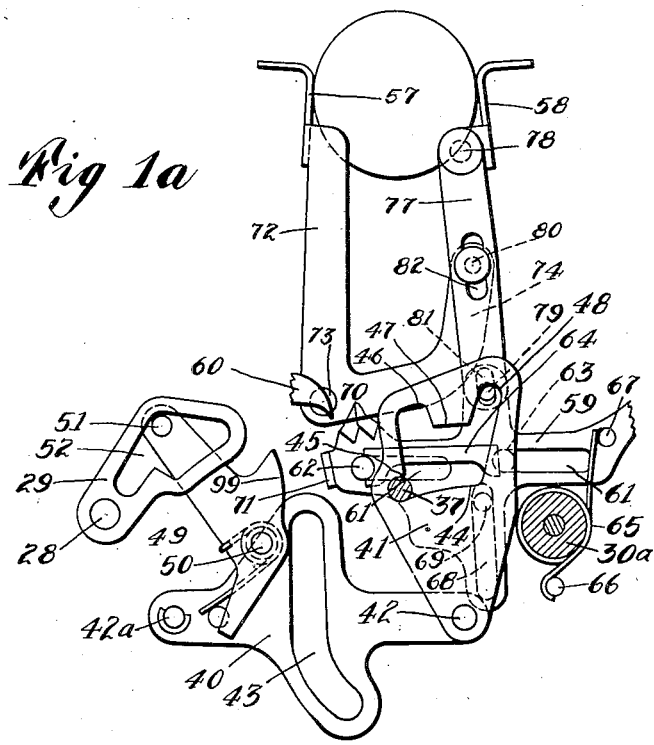

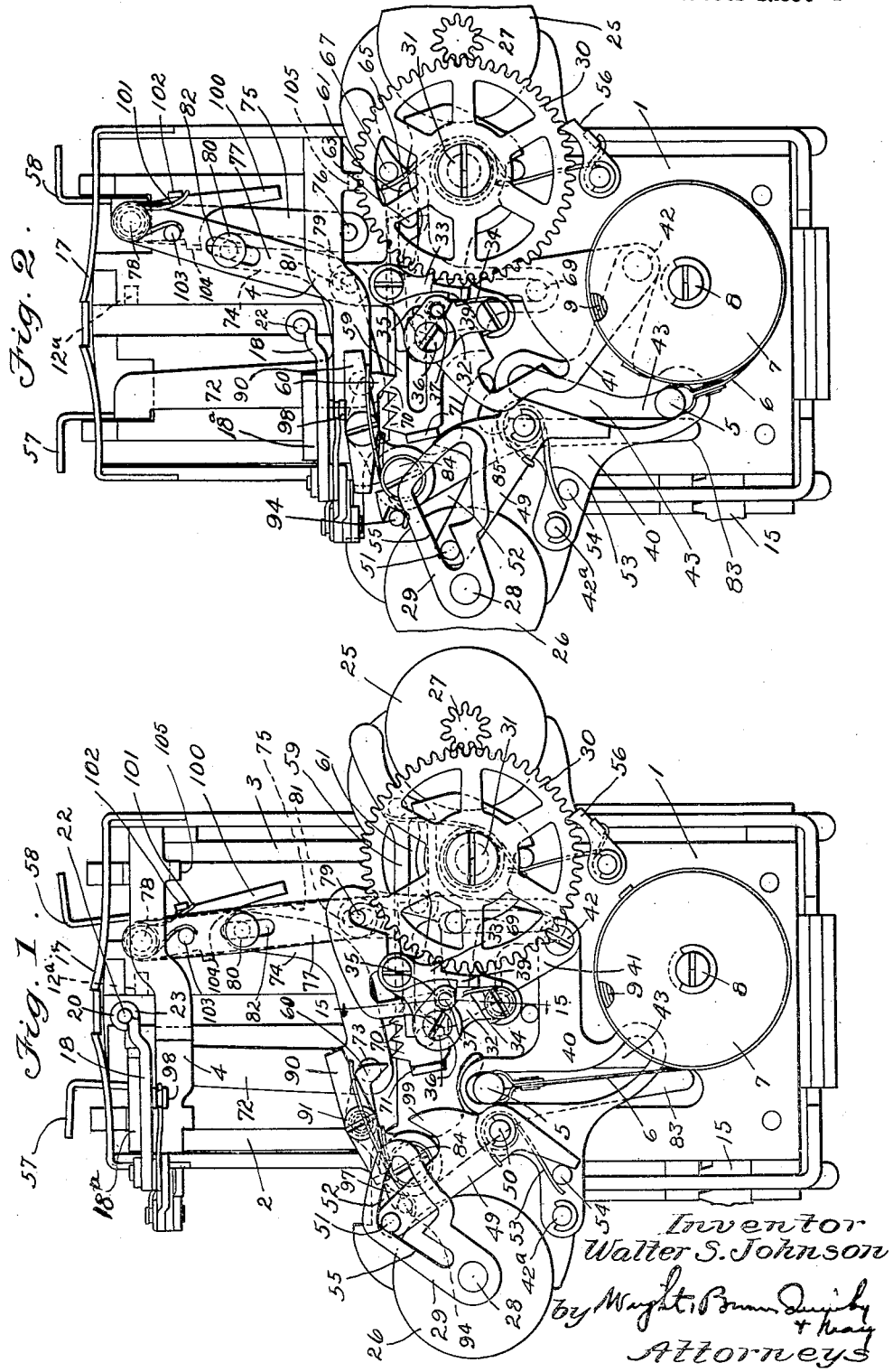
Jan. 10, 1928.
W. S. JOHNSON
FARE REGISTER
Filed Feb. 10, 1922
1,655,649
5 Sheets-Sheet 1
Inventor
Walter S. Johnson Jan. 10, 1928.

W. S. JOHNSON

FARE REGISTER

Filed Feb. 10, 1922       5 Sheets-Sheet 2

1,655,649

Inventor
Walter S. Johnson
by Wright, Brown, Quinby & May
Attys

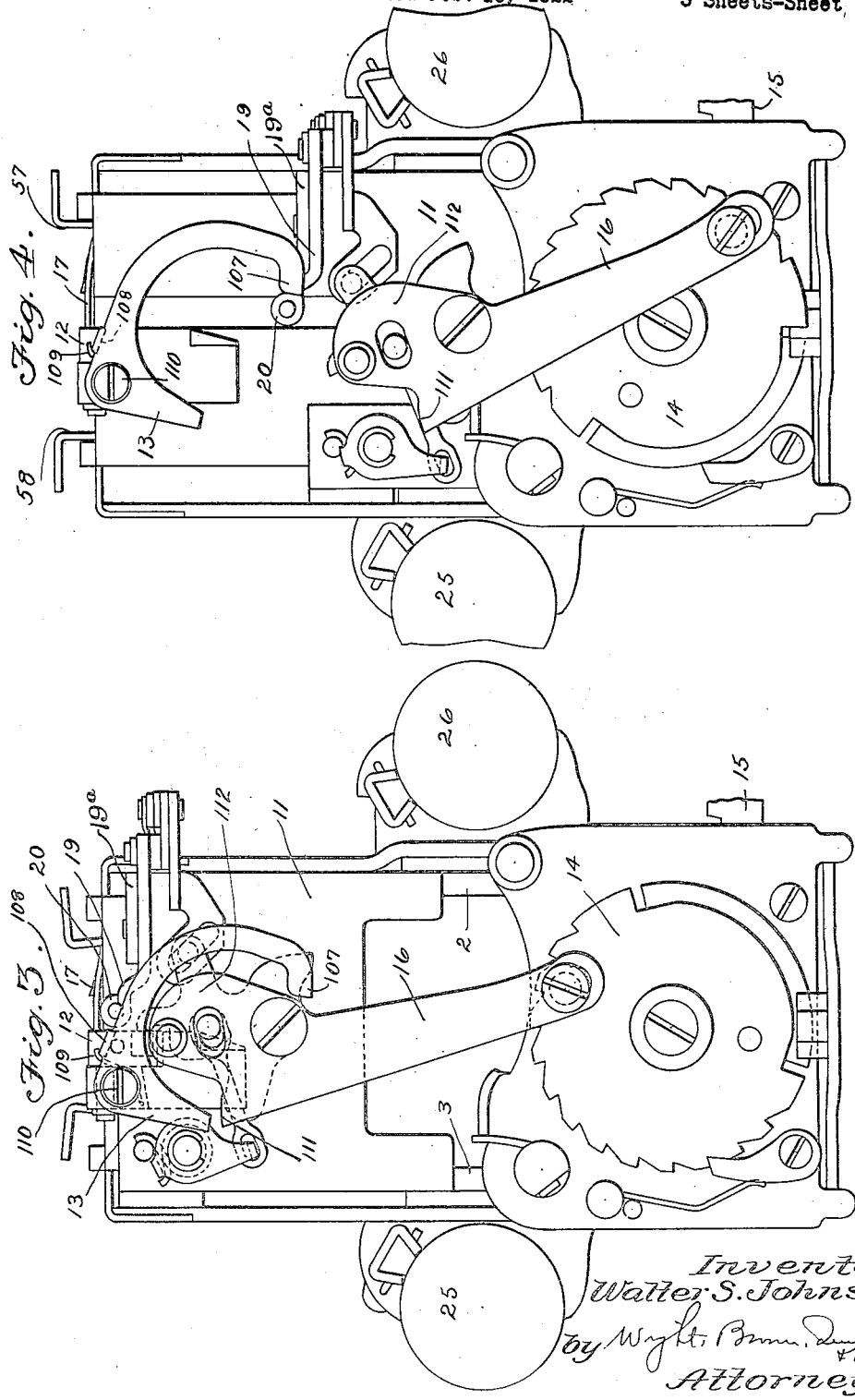

Jan. 10, 1928.
W. S. JOHNSON
1,655,649
FARE REGISTER
Filed Feb. 10, 1922
5 Sheets-Sheet 4
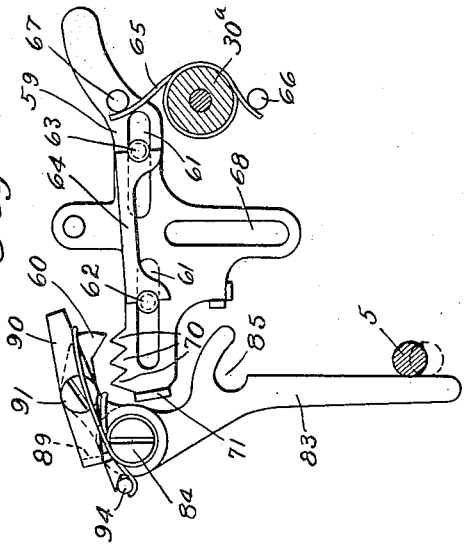
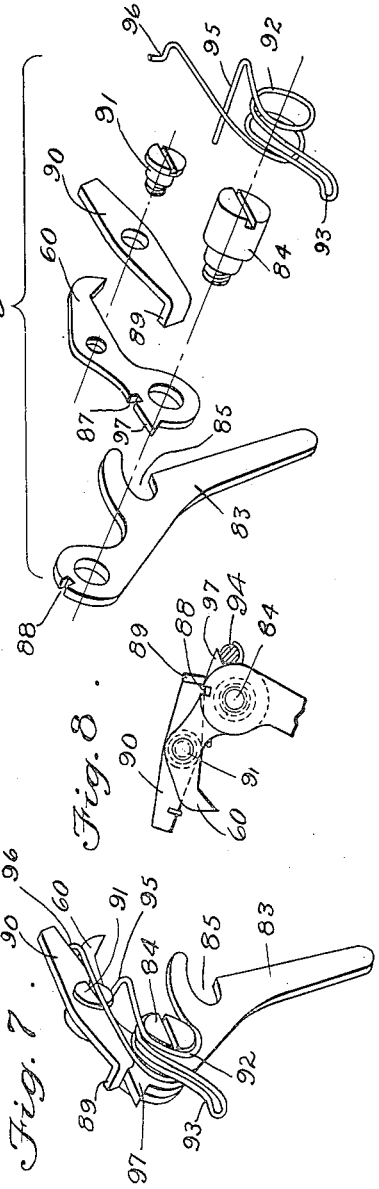
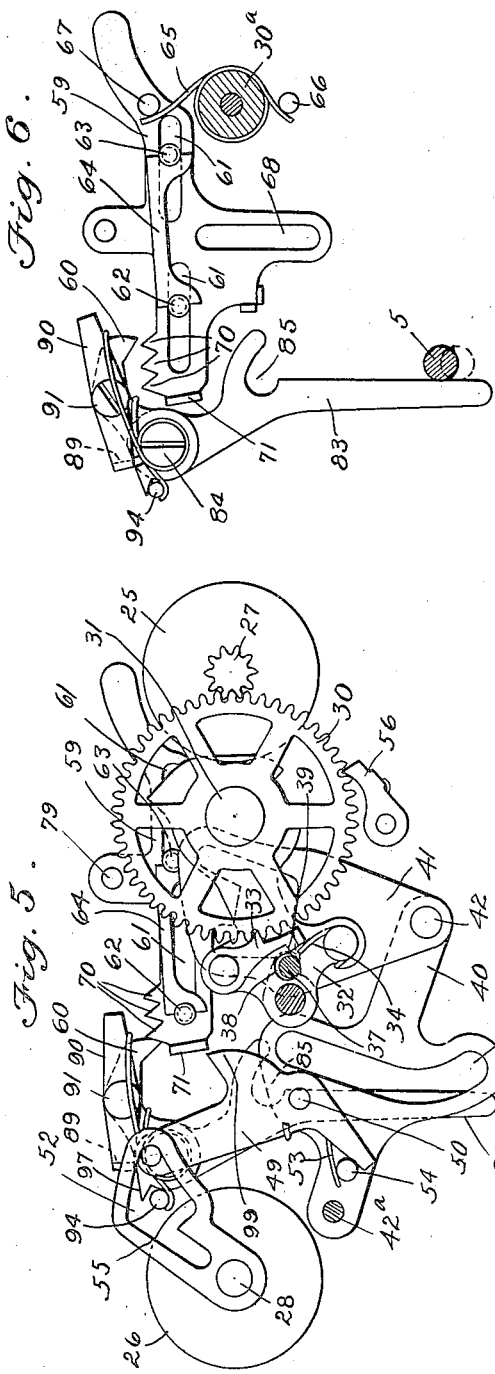
Inventor
Walter S. Johnson
by Wright, Brown, Quinby & May
Attorneys

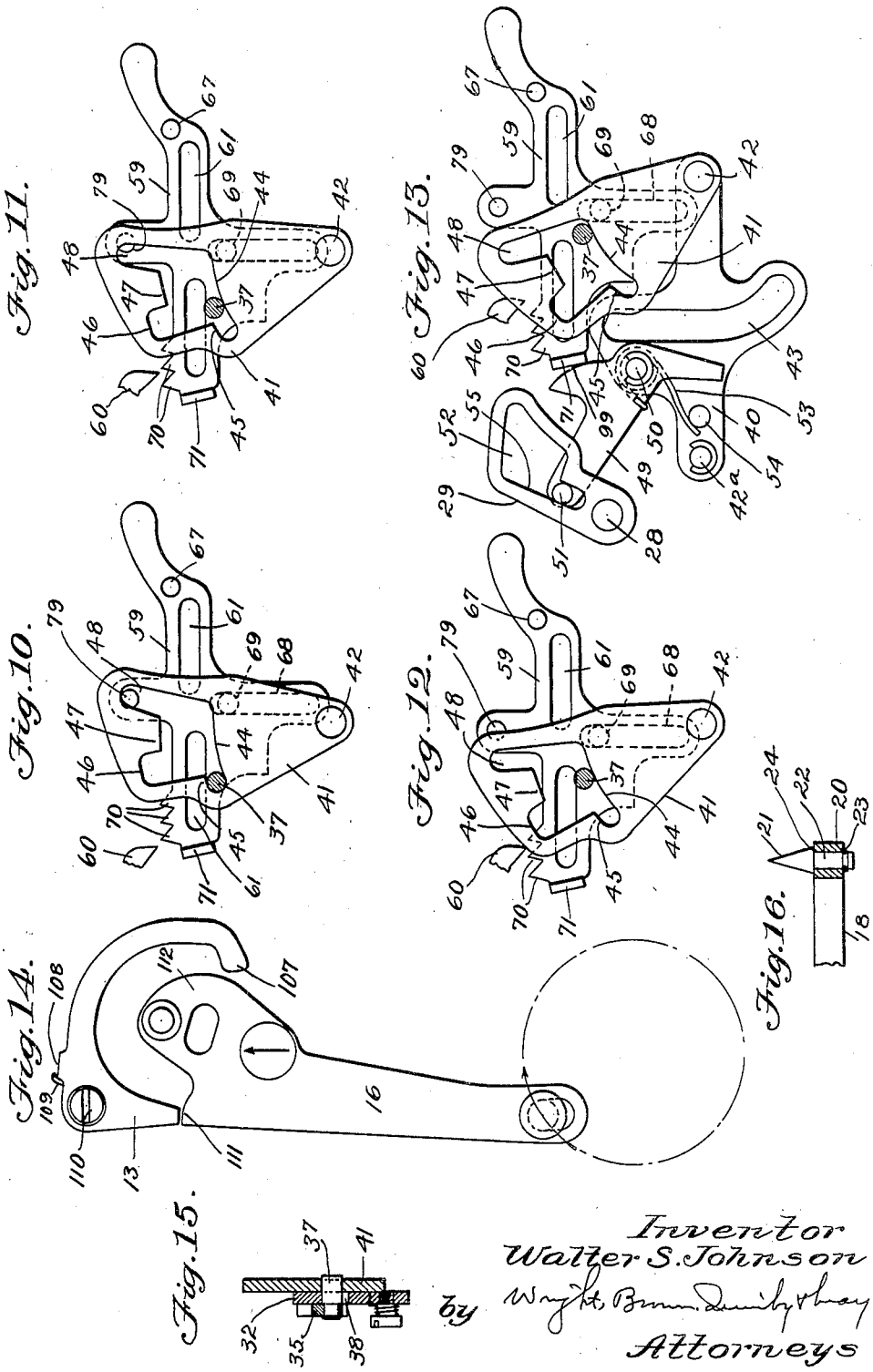

Patented Jan. 10, 1928.

1,655,649

UNITED STATES PATENT OFFICE.

WALTER S. JOHNSON, OF PROVIDENCE, RHODE ISLAND, ASSIGNOR TO ROOKE AUTOMATIC REGISTER COMPANY, OF PROVIDENCE, RHODE ISLAND, A CORPORATION OF MAINE.

FARE REGISTER.

Application filed February 10, 1922. Serial No. 535,571.

The invention herein described and claimed relates to fare registers and analogous devices or machines capable of registering unit articles of different qualities, or the values thereof and is particularly adapted to the portable type of fare registers disclosed in the prior patents of George F. Rooke, No. 690,079 granted December 31, 1901 and No. 1,294,308 granted February 11, 1919, and of Joseph A. Turck no. 1,160,215, granted November 16, 1915. Certain principles and features of the invention, however, are applicable to registering or recording machines which are not necessarily portable, and as to such principles and features my protection is not limited by the specific illustrative explanation of the invention given in this specification, or otherwise than as required by the terms and for the validity of the appended claims. Among the objects and accomplishments of the invention are the following:

First, to enable the same registering counter to tally different amounts proportional to the relative values of coins or tickets of different denominations;

Second, to provide one machine with a plurality of registering counters and a selecting mechanism by which a coin or ticket of one size will cause operation of one only of such counters and a coin or ticket of a different size will cause operation of the other counter only;

Third, to enable the amount registered to be determined before the coin or ticket inserted into the register is released by the passenger;

Fourth, to prevent resetting of the machine, and thereby prevent breakage or injury of any of the parts thereof, in case a smooth, worn coin or ticket should slip from the grasp of the grippers and fail to be fully drawn, or to drop, into the coin chute;

Fifth, to guard against the efforts of a dishonest collector to prevent tallying of the full value of a coin or ticket inserted into the machine; and Sixth, to improve the construction and mode of operation of the machine whereby the same is made more accurate than previous registers of the type indicated.

Since the fare registers of the type to which this invention relates are primarily designed to be operated by, or under the oversight of, a person who is charged with the duty of collecting cash fares from passengers in a public carrier, although they are applicable with or without modification in non essential details for other uses of a similar nature, in the following specification the operator of the machine will be generally referred to as the "collector" and the person who deposits the fare will be generally referred to as the "passenger". It will be understood, however, that the term "cash fares" is not intended to limit the scope of my protection, for the operation of such registers may be initiated or controlled in the manner hereinafter explained by any sort of a device or article, including specifically a coin, a metal ticket of disk like form, or a ticket of any other material than metal and of any outline, circular or other, which has sufficient width and sufficient stiffness for the purposes presently to be described. For the purposes of this invention a standard coin is essentially a ticket, wherefore the term "ticket" as hereinafter employed is to be construed as including in its scope standard coins, unless the context anywhere clearly implies a contrary meaning.

Figure 2A:
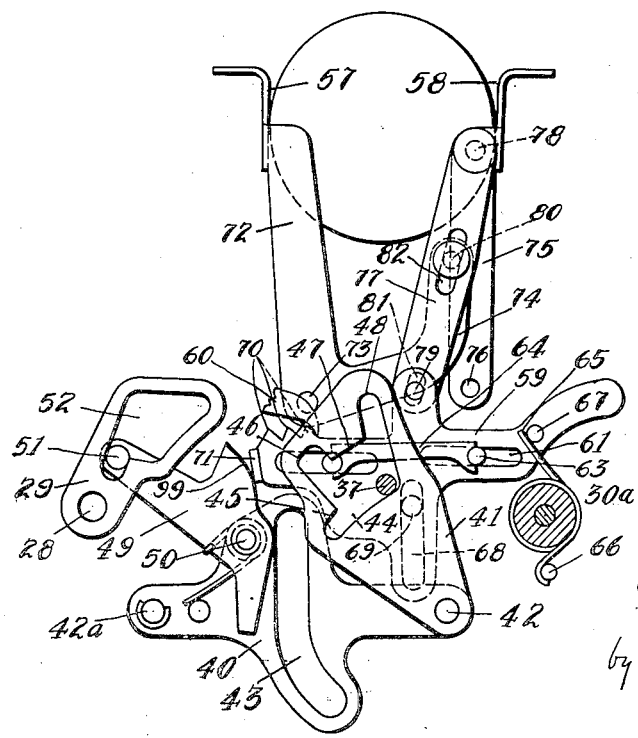

The exact nature of the invention and the manner in which it accomplishes the foregoing objects can best be explained in connection with a description in detail of a form of machine embodying the invention. Such a machine is shown in the drawings herewith furnished and in said drawings Figure 1 is a front elevation of the essential parts of the machine, represented as removed from the enclosing case, the mechanism being set in position for reception of a ticket. Fig. 1ª is a view of the selective counter driving mechanism detached from other mechanisms and in the same setting as in Fig. 1. Figure 2 is a view similar to Fig. 1 but showing the mechanism in the position which it assumes automatically after the insertion of a ticket. Fig. 2ª is similar to Fig. 1ª except that it shows the selective mechanism in the position as shown in Fig. 2. Figures 3 and 4 are rear views of the machine showing the mechanisms in positions corresponding to those in Figures 1 and 2, respectively. Figure 5 is a detail view of the registering mechanism and the selecting means, with the parts thereof in the registering position illustrated in Figure 2. Figure 6 is an elevation of the selector mechanism separated from the machine. Figure 7 is a perspective view of the selecter lock in detail. Figure 8 is an elevation of the lock as viewed from the rear. Figure 9 is a perspective view showing disassembled the various parts of the selector lock. Figures 10, 11, 12 and 13 are elevations showing the selector and associated tumbler in different positions preparatory for causing registration of tickets of respectively different values. Figure 14 is an elevation showing the safety trigger in detail. Figure 15 is a cross section taken on line 15—15 of Figure 1, showing in detail the lock for the pawl which drives one of the registering counters. Figure 16 is a fragmentary view showing one of the gripping jaws in detail.

Like reference characters designate the same parts wherever they occur in all the figures.

The machine here illustrated is substantially the same as that illustrated in the prior patents hereinbefore referred to in so far as concerns the means for taking a ticket and the means for setting the grippers which are provided to grasp the ticket, preparatory to the insertion of a ticket by the passenger, wherefore only brief description need be given here of the mechanisms provided for this purpose, reference being directed to the aforesaid patents for a complete explanation thereof.

With reference to Figures 1 and 2, 1 represents the frame and 2, 3, and 4 represent, respectively, the side bars and a transverse top member of a carriage which is arranged to reciprocate in the frame between the positions shown, respectively, in Figures 1 and 2 and carries a pin or stud 5 connected by a steel tape, or equivalent flexible strap, 6 with a barrel 7 mounted to rotate upon a stud 8 fixed to the frame and containing a spring 9.

Referring to Figures 3 and 4 the numeral 11 represents a back plate, forming part of the carriage, and secured to the side bars 2 and 3 at the rear of the frame, and on this plate is pivoted the latch which holds the carriage in the set position. The nature, and substantially the construction, of such latch and of a latch releasing tripper 12, and other parts associated therewith, are fully shown in said prior Patents No. 1,160,215 and No. 1,294,308. 14 represents a combined cam and ratchet disk which is operated by a plunger 15 and is connected by a pitman 16 with the carriage for setting the latter in position to receive a ticket. 17 is the guard which, under the control of the cam member 14, prevents insertion of a ticket into the slot provided therefor at all times except when the carriage is set. 18 and 19 are the levers, pivoted to lugs 18ª and 19ª, respectively, on the carriage, which carry the ticket-gripping jaws by which a ticket inserted by a passenger is gripped and withdrawn into the passeway provided for the travel of the ticket through the machine to a point of exit at the base of the machine. There is only one novel feature embodied in the present form of gripper; in other respects the grippers and the means for operating them are substantially the same as disclosed in said prior patents.

The novel feature of the grippers above mentioned consists in the manner in which the gripper jaws or teeth are mounted in their carrying levers. These levers are essentially alike and each is formed preferably from a stamping of sheet metal (sufficiently thick to give the required stiffness) curled up at one end to form an eye 20. The gripper jaw 21 (Fig. 16) is tapered to a point sufficiently fine to seize the inserted ticket firmly, and its shank 22 passes through the eye 20 of its lever and is retained therein by a washer 23 occupying a groove in the protruding end of the shank. Said washer is an incomplete annulus having an opening at one side of proper width to permit its being passed laterally over the shank in said groove, and to cause resilient separation of the parts at each side of such opening at that time. In other words, the washer is a horseshoe-like member, the legs of which straddle the grooved part of the shank and spring near enough together at their rear ends, after being slipped over the shank, to prevent accidental dislodgment. A shoulder 24 between the shank and the head of the gripper jaw limits the penetration of the latter into the eye.

Two registering or tallying counters 25 and 26 are provided, preferably at the locations here indicated. These counters are not shown in detail, as they are preferably of the same nature as those described in the said prior patents. It is sufficient for present purposes to be understood that the counter 25 has number indicators which are operated by rotation of a central shaft carrying a pinion 27, and that the counter 26 has number indicators operated by a central shaft 28 on which is mounted a lever 29. Rotation of the central shaft of either counter through a given minimum angle causes an addition indication of one unit, and similar rotation through a multiple of the minimum angle causes an addition indication of a corresponding multiple of the unit. In the particular machine here illustrated the right hand counter (25) is adapted to show in terms of fare units the values of tickets of three different diameters and the left hand counter (26) the values of a fourth ticket. Specifically, the tickets which control the right hand counter are a nickel (five cent piece), a dime, and a disk of which the diameter is intermediate the diameters of the nickel and the dime, and the value of which is two and one-half cents. Hence each fare unit indicated on that register has a value of two and one-half cents. The ticket of intermediate size causes registration of one unit, the nickel causes registration of two units and the dime causes registration of four units. The fourth ticket referred to is, in this illustration, a quarter dollar, which is designed to cause unit registrations of the left hand counter 26. The specific values here given, however, are illustrative only, for machines having exactly the same principles may be designed to take tickets of other sizes having different specific values, in any case where the higher values registered on one counter are multiples of a lower value registered on the same counter.

For operating the counter 25 there is provided a gear wheel 30 having a hub 30ª rotatably mounted on a stud 31 fixed upon the frame 1 of the machine and meshing with the pinion 27. A pawl carrier 32 is mounted on the same stud 31 to oscillate thereabout and carries a driving pawl 33 adapted to engage the teeth of the wheel 30 under pressure applied by a spring 34. A pawl lock 35 is pivoted on the carrier 32 by a stud 36 and carries a pin 37 (later called the "recording pin") which projects through a hole 38 (Figure 5) in the pawl carrier, said hole being slightly larger than the diameter of the pin in order to permit such movement of the lock 35 as will place it either in position to clear a shoulder 39 on the pawl, as shown in Figure 1, or to obstruct said shoulder, as shown in Figure 2. When in this obstructing position said lock holds the pawl in a positive manner in engagement with the teeth of gear 30 in order to prevent overrunning of said gear when the latter is turned at high speed through a comparatively large angle in registering multiples of the fare unit.

The driving impulses upon the pawl carrier to rotate the wheel 30 are applied by the carriage in its movement to the position shown in Figure 2 from that of Figure 1, through the agency of a lever 40, or primary driving member which I call for the purpose of identification a "driving lever," a transmission member 41 which for the same purpose I call a "transmission plate," and the pin 37. The transmission plate is connected to the driving lever 40 by a pivot pin 42, and the driving lever is pivoted on the frame by a stud 42ª. In the driving lever is a slot 43 through which the pin 5 of the carriage projects. The walls or edges of this slot are so placed that they perform the functions of cam surfaces in cooperation with the pin 5 to cause oscillation of the driving lever with movements of the carriage. When the carriage is in what I call the "set" position shown in Figure 1, the upper part of slot 43 is coincident with the path of the pin 5, while the lower part of said slot is inclined thereto. Hence, when the carriage moves after being unlatched by the insertion of a coin, it causes oscillation of the driving lever during the latter part of its travel by action of the pin 5 on an inclined part of the cam slot, thus shifting the driving lever into the position shown in Figures 2 and 5; and when the carriage is being reset it restores the driving lever during the first part of its movement, to the previous position.

The transmission plate is provided with an interior opening, as shown in detail in Figures 1ª, 2ª, and 10 to 13, into which the pin 37 projects, and at one end of this opening is an edge or surface 44 adapted to bear on said pin when the carriage is being reset, so as to release the pawl lock 35 from the pawl 33, and place the pawl carrier in position for imparting movement to the counter. Opposite to the surface 44, which may be called the restoring abutment, are three driving abutments, namely, 45, 46 and 47 located at different distances from the abutment 44; and a notch 48, the extremity of which is at a distance from the abutment 44 at least equal to the full range of travel of the transmission plate plus the diameter of pin 37. The transmission plate is adapted to be swung about its pivot 42 into either of the four positions shown in Figures 10, 11, 12 and 13, respectively, by means presently to be described. When in the position of Figure 10, the shoulder 45 is arranged to bear on the pin 37, whereby the full movement of the plate is imparted to the pawl carrier and the wheel 30 is turned through the widest arc ever given to it in one movement. In the specific instance described this condition occurs when a dime is inserted, and the movement thereby given to the counter is enough to add four units to the tally there shown. The shoulder 46 is so far distant from the pin 37 that when placed in position to come to bear thereon, as shown in Figure 11, it does not engage that pin until the transmission plate is so near the end of its movement that the remainder of such movement is enough to turn the counter driving wheel through the minimum angle only, which adds one unit to the tally. This condition obtains when the ticket of lowest or unit value is used. The shoulder 47 is arranged to bear on the pin when the transmission plate is yet far enough removed from the limit of its travel to add two units to the tally of the counter; the condition when a nickel is inserted and the transmission plate is in the position shown in Figure 12. Finally, when the transmission plate is placed in the extreme position shown in Figure 13, where the notch 48 receives the pin 37, no movement at all is given to the counter driving gear 30 and the counter 25 is not operated, but the counter 26 is caused to tally an additional unit in terms of the ticket or coin of largest size.

The number, arrangement, and distance away from the restoring abutment 44, of the driving abutments may be modified or altered from the particular arrangement here shown in any manner needed in cases where more or fewer tickets are to be registered on the same counter, or where the values of the respective tickets bear different relations to their diameters than those here shown. Thus, for instance, in case the tickets of progressively increasing values should be likewise of progressively increasing width, the driving abutments would have the arrangement of a regular series of steps instead of the present irregular arrangement.

The mechanism which operates the counter 26 consists of the arm 29 previously mentioned and a connecting lever 49 which is pivoted to the driving lever 40 by a pin 50 and carries a stud 51 entering an opening 52 in the lever 29. This opening is narrow in its part nearer to the shaft 28, and wider in its other parts. Normally the stud 51 occupies the wide part of said opening, being held there by a spring 53 which bears against the lever 49 and reacts against a stud 54 on the driving lever, wherefore, and because the width of this part of the opening 52 is greater than the travel of pin 51, the movement of the driving lever, occuring when the tickets of lower denomination are recorded, imparts no registering movement to the counter 26; but the narrow part of the opening is just wide enough to admit the stud 51 freely and enable such stud to turn the arm 29 through the angle for tallying an additional unit on the counter, when the connecting lever is displaced by the selecting mechanism (later to be described), and when the movement of the driving lever thereafter occurs. On the return of the driving lever into the set position the stud 51, being impelled both by the movement of the driving lever and by the independent movement of the lever 49 about its own pivot 50, wipes along the edge 55 of the opening and returns the actuating lever 29 to previous position. Figure 2 shows the condition of the mechanism just after a quarter dollar (ticket of highest value and largest size) has been placed in the machine and registered. Figure 5, on the other hand, shows the condition after the ticket of smallest size has been registered. Backward movement of the drive wheel 30 when the carriage is being reset is prevented by a holding pawl 56 which engages the teeth of wheel 30 in the manner shown in Figures 1, 2 and 5.

Having regard to the principles embodied in the tallying mechanism just described, it may be considered that in a generic sense the driving lever 40 is a driver for the counters, which acts through transmission mechanisms to operate one or another of the counters. The transmission mechanism for the counter 25 consists in the transmission plate 41 and the pawl and gear wheel driven by the latter; said plate being a shiftable or displaceable transmission member which is adapted to transmit to the counter a larger or smaller proportion of the movement of the driver, with correspondingly less or greater lost motion, according to the position in which it is placed by or under control of a ticket of higher or lower value. With respect to the counter 26, the connecting lever 49 is a transmission member answering the same terms as those just used in the description of the member 41. When either of these transmission members is put into the position wherein the maximum lost motion occurs, such lost motion is equal to the full amount of its travel and no effect is produced upon the counter; and at the same time, the other of the transmission members is place where it acts with less than the maximum amount of lost motion and, therefore, causes operation of the counter with which it is respectively associated.

Placement of the transmission plate 41 and the lever 49 to bring about the results just described, is effected by the inserted ticket through the agency of the selector mechanism previously mentioned, which in this illustration comprises a pair of floating fingers 57, 58 at opposite ends of the slot wherein the ticket enters, a selector 59, and a selector lock 60. The selector is a bar or plate having slots 61 through which pass two pins 62 and 63, respectively, (Figure 6) fastened to the base frame of the machine, and on which the selector has an endwise sliding movement. A retainer 64 is shown in Figures 5 and 6 and its function is to span the space between the pins at the forward side of the selector to prevent the latter from slipping off the pins. This retainer is preferably a strip of spring steel notched at its ends to fit grooves in the sides of the pins and it is sprung into said grooves. A spring wire 65 coiled about the hub 30ª of the driving gear 30 (see Figure 6) bears at one end against an abutment pin 66 fixed to the frame and at the other end upon a pin 67 carried by the selector, and tends constantly to hold the selector in its extreme right hand position (that shown in Figures 1, 1ª, 5 and 10) and to return it to that position after it has been displaced. In the lower part of the selector is an upright slot 68 which is entered by a pin 69 carried by the transmission plate and projecting rearwardly therefrom, whereby said transmission plate is coupled with the selector to be moved when the latter is moved. On the upper side of the selector, near its left hand end, are three teeth 70 which cooperate with a complemental tooth on the selector lock 60 so as to retain the selector in the position given it by spreading apart of the floating fingers by an inserted ticket of greater width than the smallest one for which the machine is designed. There is also formed upon the selector an out-turned lug 71 which cooperates with the coupling lever 49, in a manner hereinafter described, for causing operation of the counter 26.

The floating fingers control the placement of the selector in the following manner. The finger 57 is carried by a lever 72 pivoted at 73 to the frame and having a second arm 74; and the finger 58 is carried by an arm 75 which is pivoted to the frame on a pin 76 (see Figure 2). An intermediate lever 77 is connected to the arm 75 by a pin 78, to the selector 59 by a pin 79, and to the arm 74 by a pin 80. Slots 81 and 82 are cut in said lever to receive the pins 79 and 80, respectively, because these pins are constrained to move in paths diverging from those in which adjacent parts of the lever move.

It will now be seen that when the fingers 57 and 58 are spread apart from their position of closest approach (which is that shown in Figure 1) by movement of either finger alone, while the other is held fast or of both at the same time in relatively opposite directions, the intermediate lever 77 is turned about the pins 78 and 80, and thereby its lower end is swung to the left, to a position more or less closely approaching that shown in Figure 2 (which is the extreme position) according to the width of the ticket.

It will also be observed that the floating fingers can be moved in unison in the same direction without shifting the selector, because each of these fingers is on a pivoted lever, and the only connection between said levers and the selector is made by the intermediate lever 77, which is free to swing about its connection with the selector. If pressure is applied to either finger alone in the direction in which such finger is free to move, the other moves with it through an approximately equal distance, due to the connection between them made by the intermediate lever and the coupling pin 80. Under conditions of use it is impossible for the distance between the fingers to be increased by any agency except that of a ticket inserted into the entrance slot and having a width greater than this distance. The characteristic just described has a value in preventing misuse of the machine to tally values lower than those of the inserted tickets, as will be later explained in connection with an explanation of another means for preventing another character of misuse for a similar purpose.

With the location and spacing of the pivots 78, 80 and 79 here shown, such pivots being substantially all in the same line transverse to the paths in which the fingers and selector are constrained to move, the movements given to the selector 59 by spreading apart or approach to one another of the floating fingers are approximately equal to the distances through which the fingers themselves are then moved. Therefore the spacing between adjacent teeth 70 is made approximately equal to the differences in diameter of the different coins or tickets for which the machine is designed. By otherwise appropriately positioning these pivots, and particularly the pivot 80, other specific ratios or proportions between these distances and differences may be obtained.

The said fingers project upwardly above the position of the latch tripper which causes release of the carriage under the pressure of the inserted ticket, this relation being shown in Figure 2 where $12^a$ represents the toe of the tripper which is at that time pressed upon by the ticket, and thereby the positioning of the selector is accomplished by the passenger before the inserted ticket leaves his fingers. It is to be understood, of course, that the machine here illustrated is, when put to actual use, enclosed by a suitable casing which protects all of the movable parts and has an entrance slot at the top for guiding the inserted ticket between the floating fingers and into the passageway across which the tripper $12^a$ projects.

The original invention embodied in the selector mechanism just described, comprising the fingers 57 and 58, and associated parts, by which insertion of a ticket sets a selecting member for operating the register in accordance with the width of the ticket, was made and disclosed to me by George F. Rooke, and was applied by me in the design here shown to, and in combination with, other improvements in the register which I have devised and originated. I therefore do not claim said selector mechanism as my invention, and the same is claimed in a separate application for Letters Patent of the United States made by the said George F. Rooke, July 6, 1922, Serial No. 573,131.

As soon as the carriage starts to move under an impulsion of the driving spring, the lock 60 cooperates with the selector to lock the latter in the position where it has been placed in the manner just described. This lock is associated with a cam arm 83 (shown in detail in Figure 6) which is pivoted on a stud 84 fixed upon the base frame, and projects beside the path traversed by the carriage pin 5. In this arm there is a notch 85 which is occupied by said driving pin when the carriage is in the set position, and the notch then allows the part of the lever below said notch to be placed by the pressure of a spring (presently described) to a greater or less extent across the path of the driving pin. Thus the first movement of the carriage after its release by the inserted ticket displaces the arm 83 and brings the lock into engagement with that one of the teeth of the selector which is then in position to be engaged by it. Then the lever is retained in the displaced position until the carriage has been returned nearly to the position wherein it is set to receive another ticket.

Preferably the lock is so mounted upon its carrying lever that it may move relatively thereto in order to release the selector as soon as the carriage has commenced its travel to the reset position, for a reason later explained, and in order that such release may occur the lock and lever combination are constructed substantially as shown in Figures 5 to 9. The lock is pivoted independently of the lever upon the stud 84, and both the lever and lock have notches 87 and 88 adapted to be entered, when in registering position, by a coupler 89 formed as a lug on a coupler lever 90 which is pivoted to the lock by means of a stud 91 mounted upon the latter. A spring 92, preferably made from a single piece of spring wire, as shown in Figure 9, is coiled about the stud 84 so as to provide an intermediate loop 93 which presses against a fixed pin 94 set in the frame, and its ends 95 and 96 are engaged with the lock and with the coupling lever, respectively. This spring performs the triple function of pressing arm 83 toward the driving pin 5, of tending to displace the lock from the selector, and of pressing the coupling lug 89 toward the notched hub portions of the lock and lever.

Movement of the lock in this manner is limited by a shoulder 97 thereon which is adapted to abut against the pin 94. When the lock is stopped with said shoulder abutting on said pin, and the arm 83 is in the position assumed when its notch 85 receives the driving pin, the notches 87 and 88 are in line and the coupling lug 89 enters them, making the lock and arm, in effect, a rigid bell crank lever. Hence when the carriage commences its descent, the lock is firmly placed in its locking engagement with the selector, but when the carriage reaches the end of its movement after or at the same time that the value of the inserted ticket has been registered, a part carried thereby (which is specifically a downward extension 98 of the pivot by which gripper arm 18 is attached to its carrying lug 18ª comes to bear against the coupler lever and displaces the coupler from the notches. Thereby the lock is released from its controlling arm and is left free to be moved by the spring part 95 for enough to place its notch 87 out of register with the notch 88, before the next resetting movement of the carriage has carried the stud 98 out of engagement with the coupler lever. When the carriage commences to move in being reset, the lock follows it until stopped by the abutment pin 94, being then clear of the selector. Thus the initial upward movement of the carriage unlocks the selector and allows it to be returned by its spring 65 to the normal position. Figure 6 shows the condition at the instant of release of the lock in the manner just described and before the selector has been returned. Thereafter, the coupler rests against the hub of lever 83 until the arrival of the driving pin at the notch 85 permits shifting of the lever and renewed coupling thereof to the lock.

When the ticket of smallest width is used, the selector remains in its normal position and the lock although it goes through the movements thus described, has no function. But with the ticket of next larger size the lock engages the right hand side of the first tooth; with the ticket of the third size, it similarly engages the second tooth; and with the ticket of largest size it engages the third or right hand tooth, as shown in Figure 2. At that time the notch 48 of the transmission plate is in position to pass over the recording pin 37 and the latter is not moved, but the lug 71 on the end of the selector then bears against an arm 99 on the connecting lever 49 and swings such lever to place its pin 51 in the narrow part of the opening 52 in the arm 29, whereby the subsequent downward movement of the carriage rocks arm 29, as shown in Figure 2, and causes registration of an additional unit on the counter 26.

It may be noted here that the fingers 57 and 58 are not in the same plane with the arms 72 and 75 which respectively carry them, for said arms are located in front of the frame plates which define the through passage for the ticket. The fingers are offset to the rear of these arms far enough to occupy the upper end of the coin passage and to lie in the same plane with an inserted ticket. Preferably the fingers are integral with the arms, being stamped from sheet metal and so formed on the extremities of the arms that upon being properly bent they become offset as described.

Where, as in the case here described, the ticket of smallest size is likewise a coin (the dime) of higher value than a ticket of larger size, temptation is placed in a dishonest way of the collector to steal by so blocking the selector fingers that they will remain in the position to cause registration of a lower value when the smaller coin of higher value is used. In order to frustrate cheating of this nature, I provide a stop which prevents the carriage from being reset except when the selector fingers are in their closest position of approach to one another. Such stop is shown in Figures 1 and 2 and comprises a finger 100 pivoted upon the pin 78 and normally pressed outward (to the right) by a spring 101. Such spring acts on a lug 102 on the finger and reacts against a stud 103 on the lever 77, while a stop lug 104 on the finger limits movement of the finger by striking the arm 75. When the selector fingers are nearest together, the end of the stop finger lies just clear of the path in which a lug 105 on the cross member 4 of the carriage travels, and when the selector fingers are at all spread apart the stop finger is brought into the path of this lug. Hence, if an obstruction of any sort, adapted to prevent return of the selector fingers to their position of closest approach, should be placed in the machine by the collector, the stop finger would prevent the carriage from being set, thereby disabling the machine from receiving any more tickets and from ringing the bell with which it is equipped, as shown in the aforesaid Rooke Patent No. 690,079, and disclosing to all present that it has been tampered with. But with use of the machine in the intended and prescribed manner, the selector is allowed to return to its normal position with the first part of the motion of the carriage toward the set position (due to the release of the lock 60) and thereby the stop finger is permitted to clear the stop lug. This stop finger does not in any way interfere with the spread of the selector fingers by the inserted ticket or with the movement of the carriage thereafter because of the yielding manner in which it is mounted.

Possibility of cheating by causing tallying of a lower value than that of the ticket in another way is frustrated by mounting the selector fingers in a floating manner, as previously described, so that either follows the other when one alone is moved. Thus it is impossible for a dishonest collector, or a passenger in collusion with the collector, by exerting pressure on one of the fingers in the act of inserting a dime, for instance, to place the selector in position to cause registering of a five cent value or a lower value.

Sometimes, when the inserted ticket is worn smooth, the gripping fingers will slip from its faces, leaving it held in the upper end of the passageway by the pressure of the release tripper 12. If the ticket should remain in this position, the gripper might be jammed and injured when the machine is reset, or the latch which normally holds the carriage in the set position might fail to act, and the carriage would move a second trip and cause another tally, without a second ticket having been inserted. To prevent any such effects occurring the safety stop 13 (Figs. 3 and 4) is provided, and is equipped with a tail 107 and a lug 108, and is pressed upon by a spring 109. The safety stop 13 turns upon a fixed pivot 110 and the lug 108 is so arranged that it bears against the rear side of the release tripper 12 under the pressure of the spring 109, and holds the toe of said tripper in its forward position extending across the coin passage. The stop itself is arranged to coact with the shoulder 111 on the pitman 16 and the tail 107 to coact with a cam part 112 on the opposite side of the pitman.

In the normal manner of operation the cam surface 112 at the right of the pitman, that is, with respect to Figures 3, 4 and 14, first displaces the tail 107 to the right and then allows it to swing back under the pressure of spring 109. When so moved to the right, the stop 13 lies in the path of the shoulder 111, but in the normal operation the cam 112 allows it to swing back from this position soon enough and far enough to permit shoulder 111 to push it aside and slip past it before reaching the final position shown in Figure 3.

If the ticket should have remained in the passage with the release tripper pressing upon it, the movement given to the tail 107 as just described releases it from the pressure of the tripper by relieving the pressure exerted on the tripper through lug 108. But if then the ticket should not pass far enough into the passage to clear the tripper the stop 13 would remain in the way of the shoulder 111 and prevent the carriage from being returned to the fully reset position.

It is understood that the register here described is carried in the hand of the collector and presented to the passenger, or held by a stationary stand, in a more or less nearly upright position, so that the passenger is able to insert a coin or other ticket into the slot in the top. At this time the machine has been set by pressure applied through the collector's finger upon the plunger 15, or the plunger may be mechanically operated, whereby the carriage is placed in the position shown in Figure 1 and is latched therein. The ticket inserted by the passenger first spreads the selector fingers, if it is larger than the ticket of smallest size, whereby the selector is placed with respect to the locking dog 60, and the transmission plate is placed with respect to the recording pin 37, in the positions corresponding to the value of the ticket. Then, after having located the selector and transmission plate, the ticket trips the carriage latch and at once is gripped by the pointed gripper jaws and drawn into the machine by the resulting quick movement of the carriage impelled by its motor spring. In the course of the movement of the carriage, the appropriate shoulder on the transmission plate first strikes and then moves the recorder pin 37; and the movement of said pin first places the pawl lock 35 in position to prevent retraction of the driving pawl 33 from the drive wheel 30, and then advances said driving pawl and turns the wheel through the required angle to tally on the counter 25 the predetermined value of the ticket. Although the drive wheel is thus turned by a suddenly applied force, it is prevented from being carried further than desired by its own momentum through the fact that the driving pawl is locked, and so acts as a lock preventing overrunning of the wheel. The ticket passes through the interior passageway and emerges from an outlet into the hand of the collector. Then the collector again sets the machine, by pressing upon the plunger 15, and the position shown in Figure 1, is restored.

In the foregoing description the relation of the parts to one another and the directions of their relative movements have been stated with respect to the position in which the machine is shown in the drawings, and on the assumption that the longer dimension of the frame is then vertical; but no limitation in the scope for which protection is claimed is to be inferred from that fact. Neither is the scope of the invention limited to the fact that the selector has a plurality of teeth and the selector lock has only one tooth since this condition may be reversed; and in fact a reversal thereof embodying the same invention is illustrated in a companion application filed by me concurrently herewith, Serial No. 535,572.

Like principles and equivalent means for operating one and the same counter to register different values in proportion to the values or other qualities of different coins, tickets or other articles, and for selectively operating different counters by different articles may be applied to other specific machines than a fare register designed to be carried in the hand of the collector and, therefore, I do not limit my protection in all respects to the machine herein illustrated and described in detail.

What I claim and desire to secure by Letters Patent is:

1. A register having a counter, driving means for said counter comprising a primary driving member, a transmission member carried by said primary driving member and being also shiftable relatively thereto into different positions wherein, respectively, it transmits a greater or less proportion of the movement of the driving member to the counter, and means independent of said driving member controlled by an inserted article for so positioning said transmission member.

2. In a register having a counter and selecting means controlled by a dimension of an inserted article upon the initial insertion of such article, a counter operating mechanism including a transmission member shiftable into different positions by said selecting means, and a driven member arranged to advance said counter and to be moved different distances by the transmission member when the latter is in its said different positions, whereby to cause tally by said counter of smaller or larger values.

3. A register having a counter, a driver for said counter, a carriage having an invariable range of movement, grippers mounted on said carriage adapted to grasp an inserted ticket, a transmission element adapted to be interposed between said driver and carriage for transmitting movement from the latter to the former and having provision for causing greater or less extent of transmitted movement according to its position, and means arranged to be operated by an inserted ticket prior to the grasping of the ticket for shifting the position of said transmission member to different points in proportion to the width of the inserted ticket.

4. A register including a counter, a driver having an invariable range of movement, a transmission means between said driver and counter having provision for greater or less amounts of lost motion according to position, and means selectively operable by articles of different widths for putting said transmission means into positions where parts having greater or less lost motion come into action in proportion to the width of the article, a second counter normally disconnected from said driver, and means for effecting driving connection from the driver to said second counter when said transmission means is in the position of maximum lost motion.

5. A register comprising a counter, a driver for actuating said counter, transmission means between said driver and counter including a member having a series of differently positioned abutments and a complemental member upon which one or another of said abutments is adapted to bear, the first-named member being displaceable to bring its abutments selectively into operative position, and means by which an article to be tallied is enabled to shift said selective member.

6. A register comprising a driver adapted to be moved when a ticket is inserted into said register, a counter, a member movable back and forth for operating said counter, a transmission member adapted to be moved by said driver and being engageable with said counter operating member in different positions wherein, respectively, it is enabled to transmit different extents of movement thereto, and selecting means independent of said driver controlled by the inserted ticket for so placing said transmission member prior to such movement of the driver.

7. A register comprising a driver adapted to be moved when a ticket is inserted into the said register, a counter, a counter operating member, a transmission member adapted to be moved by said driver and being engageable with said counter operating member in different positions wherein, respectively, it is enabled to transmit different extents of movement thereto, said transmission member being placeable in still another position wherein it is adapted to pass through its full travel without imparting any movement to the counter operating member, and selecting means controlled by the inserted ticket for placing said transmission member in one or another of said positions according to the characteristic dimension of the ticket.

8. A register comprising two counters, a common driver therefor, transmission means for both counters carried and movable by said driver, separate driven mechanisms for the respective counters, and selective means connected with said transmission means and actuated by an inserted ticket for placing said transmission means into motion transmitting relation with one or the other of said driven mechanisms exclusively.

9. A register comprising a plurality of registering counters, a driver, and selective coupling means intermediate said counters and the driver operable by an article inserted in the register to be tallied thereby for putting either counter exclusively into driven connection with the driver.

10. A register comprising a plurality of registering counters, separate counter operating devices associated respectively with each of said counters, a driver, and means for selectively coupling said driver to either of said counter operating devices exclusively, the means for so coupling said driver with one of said devices having provisions for causing the said last named device to be moved different amounts according to the position of said coupling means with respect to said device.

11. A register comprising a plurality of relatively stationary counters, a driver, separate disengagable transmission means for each counter for transmitting motion thereto from the driver, and selective means operable by an inserted ticket to take one or another of its prescribed different positions according to a dimension of such ticket, for causing operative engagement of one, and disengagement of another, of said transmission means.

12. A register having two counters, a driver, shiftable transmission mechanism adapted to connect said driver exclusively with one or the other of said counters, and means controlled by an inserted article for causing said mechanism to connect the driver with one or the other of the counters when one or another of articles differing in a characteristic dimension is placed in the register.

13. A register comprising a counter, a driver therefor, transmission mechanism between said driver and counter adapted to actuate the latter to tally larger or smaller amounts according to the position of said mechanism, and selector mechanism independent of said driver controlled by a dimension of the article being registered and arranged to be actuated during the insertion of such article into the register, connected with said transmission mechanism to place the latter in one or another of its counter actuating positions according as the characteristic dimension of the article is greater or smaller.

14. In a register having a passageway for an inserted ticket, selector fingers at opposite sides of said passageway adapted to be spread apart from one another by a ticket of greater than minimum width, and a counter, a driver for said counter including a transmission member arranged to be placed in different positions according as said fingers are more or less separated from one another; said member being constructed to impart a certain movement to said counter when in one position, and a greater movement when in another position.

15. In a register having an entrance passage for receiving a ticket, selector fingers mounted at opposite sides of said passage whereby the inserted ticket may pass between them, said fingers being freely movable from side to side in the direction of the width of the passage, and connecting means between said fingers arranged to cause either to follow the movement of the other when one alone is moved, a counter, a driver, shiftable transmission means adapted to transmit movement in greater or less amounts from the driver to the counter according to its position, and means by which said connecting means shifts said transmission means when the fingers are spread from a position of closest approach to one another.

16. In a register, a frame having a passage adapted to receive an inserted ticket, gripping means operative adjacent to said passageway for gripping an inserted ticket, a carriage by which said grippers are supported and moved, a counter, mechanism operable in unison with the travel of the carriage for operating said counter and including a shiftable transmission member adapted to transmit a greater or less proportion of the movement of the driver according to its position, and selective means for shifting said transmission member in proportion to the value of a ticket inserted in the passage, said means including a pair of fingers adjacent to opposite sides of the passage in position for the inserted ticket to pass between them and movable apart from one another by a ticket of greater width, said fingers being far enough in advance of the grippers to be separated by the ticket to its full width before the latter is grasped by the grippers.

17. In a fare register, a counter actuating mechanism including a transmission member, a part movable by said member and adapted to operate the counter, said member having portions adapted to act upon said part with greater or less amounts of lost motion and being shiftable in a manner to place one or another of said portions in position to act on said part.

18. The combination of a transmission member, means for moving said member back and forth in a given path, said member having abutments at different distances from a given point in such path and located side by side, a counter operating device and means for so shifting said transmission member as to bring one or another of said abutments into position to move said device when the transmission member is moved in its appointed path.

19. In a registering mechanism, a counter, a driver, a transmission member movable by the driver and being shiftable transversely to the direction in which it is moved by the driver and having abutments which are arranged to be located separately by such shifting in a given path, said abutments having respectively different positions in said path when so placed, a driven element arranged in said path and adapted to be engaged and moved by one or another of said abutments according to the placement of the transmission member, and means by which said driven element drives said counter.

20. In a registering mechanism, a counter, a driver and transmission mechanism between said driver and counter including a transmission member and a driven member adapted to be moved by the transmission member along the path of movement thereof and being coupled to actuate the counter, said transmission member being shiftable transversely of its motion transmitting movement and having abutments adapted to be brought by such shifting into the path of movement of the driven member, said abutments having different positions longitudinally of said path, whereby to give greater or less proportions of the total movement of the transmission member to the driven member.

21. A fare register comprising a frame having an admission inlet for tickets, a carriage having gripping means adapted to grasp and carry said tickets into the machine, a counter, a driver, motive means for propelling said carriage and driver, a driven member movable and coupled to operate said counter for tallying larger or smaller values thereon in proportion to its extent of movement, a transmission member between said driver and driven member being shiftable transversely to the direction of its operative movement and having abutments differently positioned longitudinally of such movement adapted to be brought into operative position separately by such shifting, and selective means operated by the inserted ticket proportionately to a dimension of said ticket for so shifting the transmission member.

22. A fare register as claimed in claim 21 and including as a part of said selective means a selector having connection with said transmission member and being arranged to move in a direction for shifting said member as set forth and a lock arranged to hold said selector in displaced position under control of the carriage, said selector and lock having a plurality of complemental locking abutments adapted to hold the selector in either one of a plurality of different positions.

23. In a registering mechanism, the combination with a ticket carriage, means for moving said carriage, a counter operating mechanism including selective means for causing a higher or lower addition by said counter proportional to a dimension of the ticket, of a selector, means arranged to be engaged by an inserted ticket and connected to said selector so as to shift the latter when the position of said ticket-engaging means is altered, and a lock controlled by the movement of the carriage arranged to hold said selector in its displaced position during the ticket carrying progress of said carriage.

24. In a registering mechanism as claimed in claim 23, an operating member for the said lock arranged and controlled to place the lock in locking relation with the selector upon commencement of the said travel of the carriage.

25. In a registering mechanism as claimed in claim 23, an arm coupled to said lock and a stud carried by said carriage and arranged to bear on said arm in a manner to move the same so as to place the lock in locking engagement with the selector upon commencement of the ticket-carrying travel of the carriage.

26. In a registering mechanism, the combination with a ticket carriage, means for moving said carriage, a counter operating mechanism including selective means for causing a higher or lower addition by said counter proportional to a dimension of the ticket, of a selector, means arranged to be engaged by an inserted ticket and connected to said selector so as to shift the latter when the position of said ticket engaging means is altered, a lock for holding said selector in displaced position during the ticket carrying progress of said carriage, an actuating arm for said lock controlled by the carriage, a coupling between said arm and lock adapted to transmit movement from the former to the latter in the direction to lock the selector, a spring acting upon said lock tending to displace it from its locking position, means by which the carriage uncouples said coupling prior to returning into position for receiving a ticket, and complemental stops connected with the carriage arranged to obstruct such return except when said ticket engaging means are positioned conformably to the dimension of a narrower ticket.

27. In a registering mechanism, a carriage having means for carrying a ticket, combined with selectively controlled registering means for tallying values proportional to certain characteristics of different tickets inserted into the machine, a selector for governing the action of said tallying means, a ticket engaging means adjacent to the ticket entrance adapted to be engaged and positioned according to a dimension of the ticket and connected with said selector so as to shift the same when moved under control of the ticket, a lock for holding the selector in displaced position, an operating arm for said lock movable independently thereof, a coupling arranged to connect said lock and operating arm rigidly together, complemental means on the carriage and operating arm for shifting the latter with the commencement of ticket tallying movement of the carriage so as to place the lock in engagement with the selector, said means being further operative to maintain said engagement during the entire travel of the carriage, a spring acting on the lock tending to disengage it from the selector, means by which the carriage at the end of its travel disconnects said coupling, a spring tending to return the selector from its displaced position and thereby to bring said ticket-engaging means into the position assumed when the ticket inserted is of the minimum dimension, and complemental arresting means associated with the carriage and ticket-engaging means arranged to prevent return of the carriage into position for receiving a ticket except when the ticket-engaging means is in the last-named position.

28. In a registering mechanism, a counter, a driving pawl and toothed wheel for actuating said counter, a carrier for said pawl and a driver for said pawl carrier having a limited amount of lost motion with respect thereto and having means for locking the pawl with respect to the toothed wheel as the result of such lost motion during the driving impulse and for releasing the pawl during the return impulse.

29. In a registering mechanism, a toothed wheel, a driving pawl for said wheel, a carrier on which said pawl is mounted, the pawl having a locking shoulder on the opposite side from its driving part, a pawl lock arranged to be moved into and out of obstructive relation to said shoulder, whereby it respectively prevents and permits disengagement of the pawl from the toothed wheel, and a member arranged to receive impulses for driving and returning the pawl carrier and connected to said lock with provision for lost motion relative to the pawl carrier to an extent permitting and causing said pawl lock to be placed in its obstructing position during the driving stroke and in its unobstructing position for the release of the pawl during the return stroke.

30. In a registering mechanism, the combination with a ticket carriage, of ticket grippers mounted upon said carriage and each including a lever and a jaw, the lever having an eye and the jaw having a shank which extends through said eye, with a groove surrounding said shank, and a washer having an opening in one side embracing the shank in said groove and overlapping the adjacent surface of the eye to retain the jaw.

31. In a registering mechanism, the combination of two counters, a driver, two transmission members coupled to said driver, one being arranged to actuate one counter and the other being arranged to actuate the other counter, driven members operable by the transmission members respectively for applying motion to the respective counters, there being between each of said transmission members and its associated driven member provision for more or less lost motion according to the position of displacement of the transmission members, and selective mechanism arranged to act upon both of said transmission members for shifting them simultaneously into positions wherein as to one such lost motion is a maximum and as to the other is a minimum.

32. A registering mechanism comprising two counters, a common driver for said counters, a transmission member for each counter, a driven member for each counter adapted to be actuated by the respective transmission members, said transmission members being displaceable and being arranged with respect to their associated driven members to act either with such lost motion that no movement is imparted to the driven member, or with a less lost motion to impart sufficient movement to the driven member to cause tallying action of the associated counter, and a selector arranged to act on said transmission members for putting either into the position of less lost motion and the other simultaneously into the position of maximum lost motion, whereby either counter is operated exclusively of the other.

33. In a registering machine, a spring-actuated carriage having ticket grasping means and adapted to propel an inserted ticket, a latch for holding said carriage in position to receive a ticket, a tripper operable by the inserted ticket for releasing said latch, an abutment having a shoulder and a cam surface connected with said carriage and operable to return it to latched position, a safety stop pivotally mounted and having a lug bearing on said tripper, and a tail in position to coact with said cam surface; said cam surface and tail being arranged to displace said lug from said tripper to permit release of a coin accidentally pressed upon by the latter.

34. In a registering machine, a spring driven carriage adapted to grasp and propel a ticket inserted into the machine, a latch for holding said carriage in position to receive the ticket, a tripper extending across the path of the inserted ticket adapted to be operated thereby for releasing the latch, mechanism for returning the carriage into latched position, said mechanism having a cam surface upon a part thereof, a pivoted member having a lug arranged to bear upon said tripper and normally hold the same extending across the ticket receiving passage, and a tail extension connected to said lug arranged to be engaged by said cam surface during the movement of return of the carriage whereby to relieve the tripper of the pressure of said lug.

35. In a selective register of the character described, a carriage, a selector shiftable by an article inserted in the register, a lock for holding the selector in the position to which it is shifted, means for bringing said lock into action to secure the selector at the beginning of movement of the carriage, and means for releasing the lock at the end of such movement of the carriage.

In testimony whereof I have affixed my signature.

WALTER S. JOHNSON.